United States Patent
Kakani et al.

(10) Patent No.: US 10,634,770 B2
(45) Date of Patent: Apr. 28, 2020

(54) OPTICAL SYSTEMS FOR REMOTE SENSING RECEIVERS

(71) Applicant: Apple Inc., Cupertino, CA (US)

(72) Inventors: Chandra S. Kakani, Fremont, CA (US); Alexander Shpunt, Portola Valley, CA (US); Mina A. Rezk, Los Gatos, CA (US); Robert S. Upton, Mountain View, CA (US); Yuval Gerson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 15/636,566

(22) Filed: Jun. 28, 2017

(65) Prior Publication Data

US 2018/0003803 A1  Jan. 4, 2018

Related U.S. Application Data

(60) Provisional application No. 62/356,454, filed on Jun. 29, 2016.

(51) Int. Cl.
*G01C 3/08* (2006.01)
*G01S 7/481* (2006.01)
(Continued)

(52) U.S. Cl.
CPC .......... *G01S 7/4816* (2013.01); *G01S 7/4815* (2013.01); *G01S 17/87* (2013.01); *G01S 17/89* (2013.01);
(Continued)

(58) Field of Classification Search
CPC ...... G01S 7/4816; G01S 7/4815; G01S 17/89; G01S 17/87; G02B 13/22; G02B 13/004;
(Continued)

(56) References Cited

U.S. PATENT DOCUMENTS

| 4,052,666 A | 10/1977 | Fletcher et al. |
| 4,154,000 A | 5/1979 | Kramer |

(Continued)

FOREIGN PATENT DOCUMENTS

| CN | 101288105 | 10/2008 |
| EP | 2503357 | 9/2012 |

(Continued)

OTHER PUBLICATIONS

International Search Report and Written Opinion from PCT/US2017-039980, dated Oct. 16, 2017, Apple Inc., pp. 1-12.

(Continued)

*Primary Examiner* — Mark Hellner
(74) *Attorney, Agent, or Firm* — Robert C. Kowert; Kowert, Hood, Munyon, Rankin & Goetzel, P.C.

(57) ABSTRACT

Optical systems that may, for example, be used in remote sensing systems, for example in systems that implement combining laser pulse transmission in LiDAR and that include dual transmit and receive systems. A dual receiver system may include a receiver including an optical system with a relatively small aperture and wide field of view for capturing reflected light from short-range (e.g., <20 meters) objects, and a receiver that includes an optical system with a relatively large aperture and small field of view for capturing reflected light from long-range (e.g., >20 meters) objects. The optical systems may refract the reflected light to photodetectors (e.g., single photo-avalanche detectors (SPADs)) that capture the light. Light captured at the photodetectors may, for example, be used to determine range information for objects or surfaces in the environment.

21 Claims, 8 Drawing Sheets

(51) Int. Cl.
  *G02B 13/00* (2006.01)
  *G01S 17/89* (2020.01)
  *G01S 17/87* (2020.01)
  *G02B 13/22* (2006.01)
  *G02B 9/64* (2006.01)
  *G02B 9/60* (2006.01)
  *G02B 9/62* (2006.01)

(52) U.S. Cl.
  CPC ....... *G02B 13/004* (2013.01); *G02B 13/0045* (2013.01); *G02B 13/22* (2013.01); *G02B 9/60* (2013.01); *G02B 9/62* (2013.01); *G02B 9/64* (2013.01)

(58) Field of Classification Search
  CPC ........ G02B 13/0045; G02B 9/60; G02B 9/62; G02B 9/64
  USPC ........................................................ 356/4.01
  See application file for complete search history.

(56) References Cited

U.S. PATENT DOCUMENTS

| | | | |
|---|---|---|---|
| 5,627,686 | A | 5/1997 | Ohshita |
| 9,234,964 | B2 | 1/2016 | Mheen et al. |
| 9,549,102 | B2 | 1/2017 | Song et al. |
| 9,625,582 | B2 | 4/2017 | Gruver et al. |
| 2004/0131504 | A1 | 7/2004 | Landers et al. |
| 2007/0206187 | A1 | 9/2007 | Lundquist et al. |
| 2010/0283837 | A1* | 11/2010 | Oohchida .............. G02B 1/005 348/47 |
| 2011/0115965 | A1 | 5/2011 | Engelhardt et al. |
| 2012/0242972 | A1* | 9/2012 | Wee ........................ G01S 7/486 356/4.01 |
| 2015/0062555 | A1 | 3/2015 | Kim |
| 2015/0316473 | A1 | 11/2015 | Kester et al. |
| 2015/0369565 | A1* | 12/2015 | Kepler .................... F41G 1/38 348/143 |
| 2017/0059858 | A1 | 3/2017 | Tilleman |
| 2018/0003803 | A1 | 1/2018 | Kakani et al. |
| 2018/0210177 | A1 | 7/2018 | Liu et al. |
| 2018/0321686 | A1 | 11/2018 | Kanzawa et al. |

FOREIGN PATENT DOCUMENTS

| | | |
|---|---|---|
| TW | 201337357 | 9/2012 |
| TW | 201606284 | 2/2016 |

OTHER PUBLICATIONS

International Search Report and Written Opinion from PCT/US2017/048042, dated Jan. 31, 2018, Apple Inc., pp. 1-19.
Office Action from Taiwan Patent Application No. 106128494, dated Feb. 12, 2018 (English Translation & Taiwan version), Apple Inc., pp. 1-10.
Invitation to Pay Additional Fees from PCT/US2017/048042, dated Nov. 24, 2017, Apple Inc., pp. 1-16.
Bronsi, Danilo, et al., "Automotive Three-Dimensional Vision Through a Single-Photon Counting SPAD Camera", IEEE Transactions on Intelligent Transportation Systems, IEEE, Piscataway, NJ, vol. 17, No. 3, Mar. 1, 2016, pp. 782-795.
Fujijilm Corporation, "Fujinon CCTV lens," Sep. 1, 2010, XP055422860, downloaded from http://www.fujifilmusa.com/shared/bin/FUJINON-FA-MV-CCTV-LENS-Brochure.pdf, pp. 1-14.
Mark Fralick, et al., Technical Disclosure Commons Defensive Publications Series Fast Time-Of-Flight Camera Lens Assembly, Mar. 31, 2016, XP055423166, http://www.tdcommons.org/cgi/viewcontent.cgi?article=1198&context=dpub_series, pp. 1-8.
U.S. Appl. No. 15/636,566, filed Jun. 28, 2017, Chandra S. Kakani, et al.
U.S. Appl. No. 15/682,207, filed Aug. 21, 2017, Robert S. Upton.
U.S. Appl. No. 15/682,207, filed Aug. 21, 2017, Robert S. Upton, et al.

* cited by examiner

OPTICAL SYSTEMS FOR REMOTE SENSING RECEIVERS

PRIORITY INFORMATION

This application claims benefit of priority of U.S. Provisional Application Ser. No. 62/356,454 entitled "OPTICAL SYSTEMS" filed Jun. 29, 2016, the content of which is incorporated by reference herein in its entirety.

BACKGROUND

Remote sensing technologies provide different systems with information about the environment external to the system. Diverse technological applications may rely upon remote sensing systems and devices to operate. Moreover, as increasing numbers of systems seek to utilize greater amounts of data to perform different tasks in dynamic environments; remote sensing provides environmental data that may be useful decision-making. For example, control systems that direct the operation of machinery may utilize remote sensing devices to detect objects within a workspace. In some scenarios, laser based sensing technologies, such as light ranging and detection (LiDAR), can provide high resolution environmental data, such as depth maps, which may indicate the proximity of different objects to the LiDAR.

SUMMARY

Optical methods and systems are described that may, for example, be used in remote sensing systems such as light ranging and detection (LiDAR) applications, for example in systems that implement combining laser pulse transmission in LiDAR and that include dual transmit and receive systems. Receiver components of a dual receiver system in LiDAR applications may include an embodiment of a relatively small aperture wide field of view (FOV) optical system for short-ranges (referred to as short-range optical system), and an embodiment of a relatively large aperture optical system with a smaller FOV for long-ranges (referred to as long-range optical system). Both the long-range and short-range optical systems may utilize optical filters, scanning mirrors (e.g., micro electro-mechanical (MEMS) mirrors), and photodetectors (also referred to as photosensors or sensors), for example one or more one-dimensional single photo-avalanche detectors (SPADs) to increase the probability of positive photon events.

An example light ranging and detecting (LiDAR) device is described that combines laser pulse transmissions in a common optical path and in which embodiments of the short-range and long-range optical systems may be implemented. In the example LiDAR device, different laser transmitters may transmit respective trains of pulses which may be combined and separated in the optical path of the LiDAR according to the polarization state of the laser pulses. In this way different types of laser pulses may be combined, including laser pulses with different wavelengths, widths, or amplitudes. The transmission of laser pulses in the different trains of pulses may be dynamically modified to adjust the timing of when laser pulses are transmitted so that different scanning patterns may be implemented. Receiver components of the LiDAR device may incorporate embodiments of the long-range optical system and short-range optical system as described herein.

Figure 1:
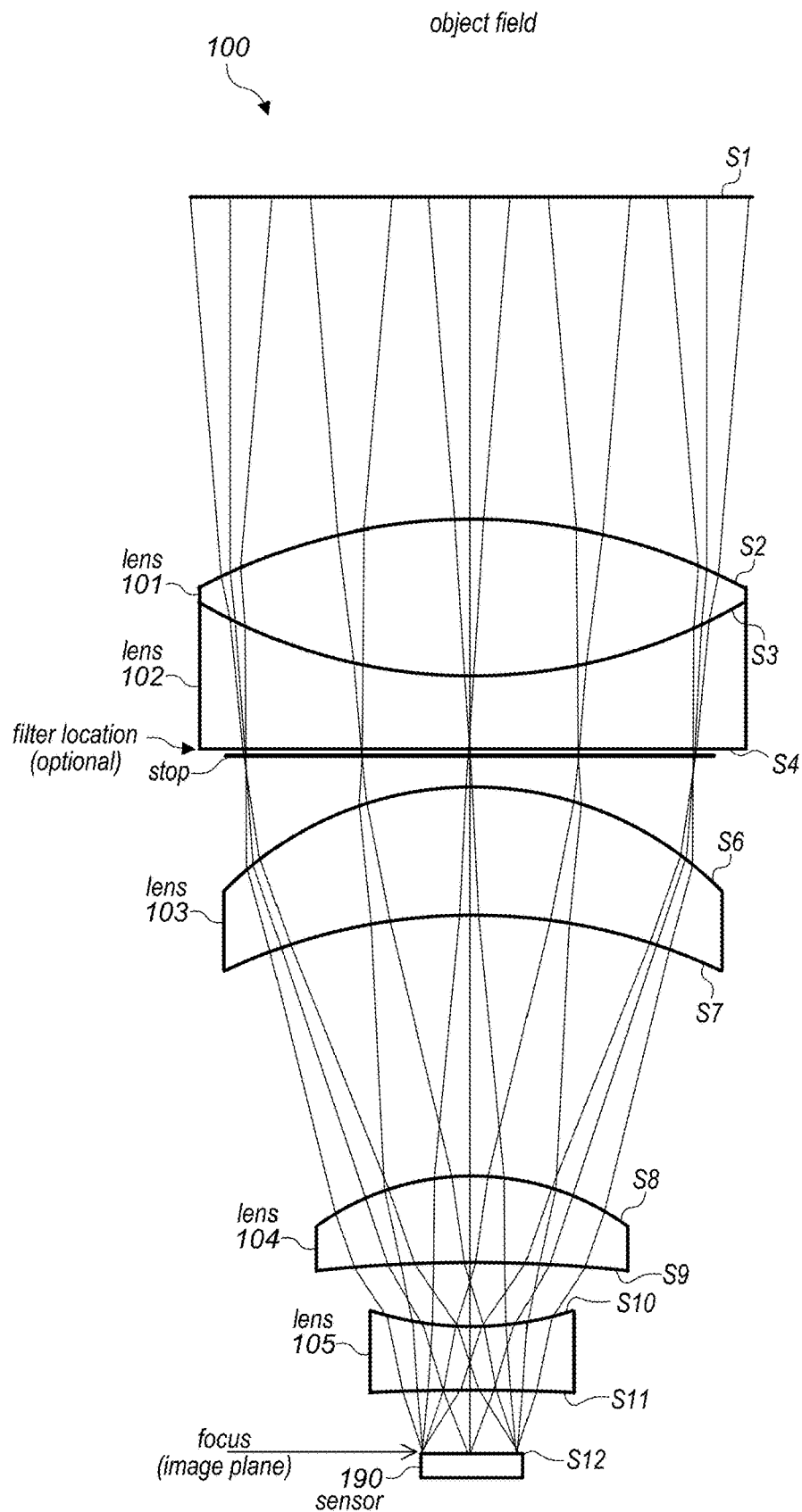
FIG. 1 illustrates an example embodiment of an optical system that may, for example, be used as a long-range optical system in LiDAR applications.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 6A:
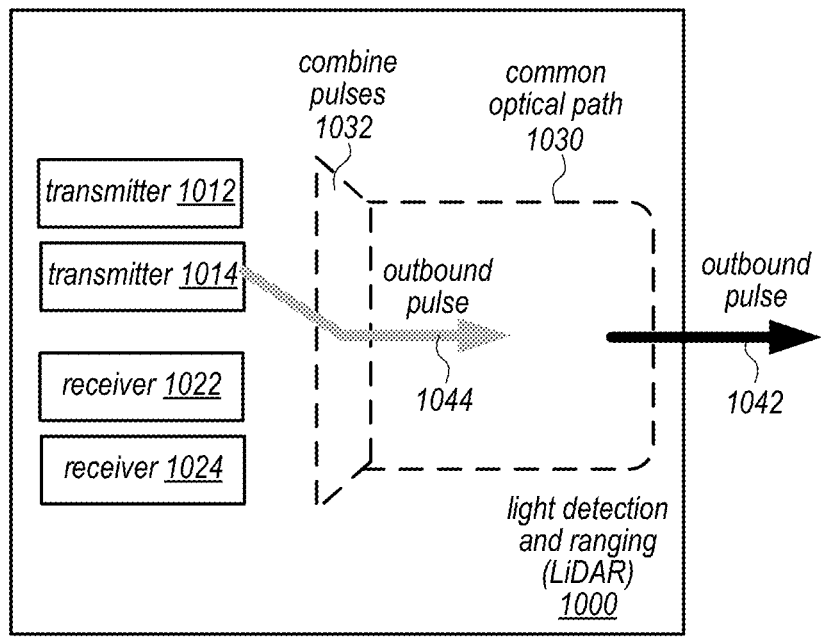
FIGS. 6A and 6B are logical block diagrams of an example LiDAR system that combines laser pulse transmissions in light ranging and detecting (LiDAR), according to some embodiments.
Figure 6B:
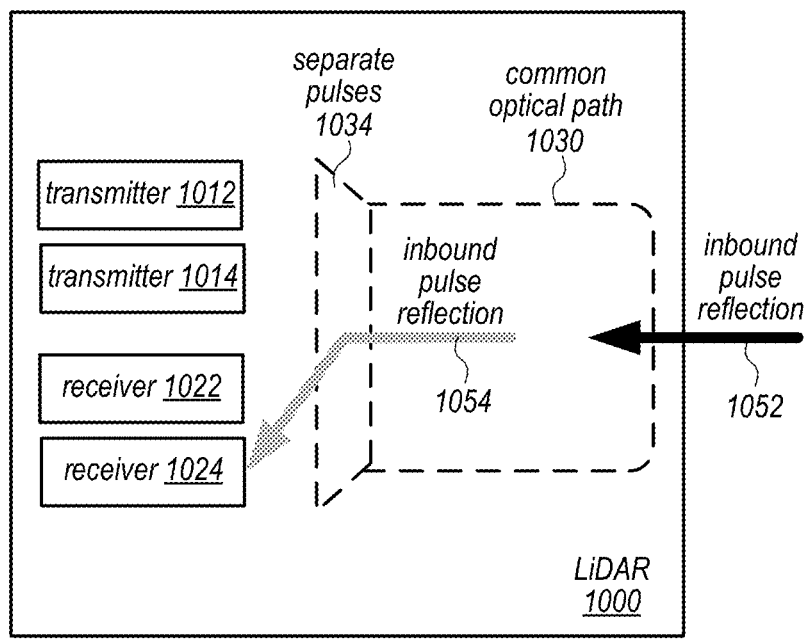

Optical methods and systems are described herein that may, for example, be used in remote sensing systems such as light ranging and detection (LiDAR) applications, for example in systems that implement combining laser pulse transmission in LiDAR as illustrated in FIGS. 6A and 6B. LiDAR is a remote sensing technology that directs a laser or lasers at a target and measures a distance to the target according to reflections of the laser(s) detected at the LiDAR. The distance may be calculated based on the difference between a time at which a laser pulse transmission is sent and a time at which a reflection of the laser pulse transmission is received. Distance measures calculated by LiDAR are used in many different applications. For instance, multiple distance measures taken over an area can be processed to generate a high resolution map, which can be used in a variety of different applications, including, but not limited to, geological surveys, atmospheric measurements, object detection, autonomous navigation, or other remote environmental sensing applications. Note that the term "LiDAR" as used herein is sometimes designated or referred to in other texts differently, including such terms as "Lidar", "lidar", "LIDAR", or "light radar."

Long-range and Short-range Receiver Optics

FIGS. 1 through 5 and Tables 1 through 5 illustrate various embodiments of optical systems that may, for example, be used as long-range and short-range optical systems in long-range and short-range receivers of remote sensing systems such as LiDAR systems, for example as illustrated in FIGS. 6A through 7B. An advantage of the dual transmit and receive system for LiDAR is a realizable architecture that includes scanning mirrors, micro electromechanical (MEMS) mirrors, single photo-avalanche detectors (SPADs) for counting single photoelectron events from close (short) range (e.g., 20 meters or less) and long-range (e.g., 20 meters to 200 meters) with acceptable manufacturing risk, eye safety margin, and probability of photon detection.

Components of a dual receiver system in LiDAR applications may include a relatively small aperture wide field optical system for short-ranges (referred to as a short-range optical system), and a relatively large aperture optical system with a smaller field for long-ranges (referred to as a long-range optical system). Both the long-range and short-range optical systems may utilize optical filters, scanning mirrors, and a sensor, for example one or more single photo-avalanche detectors (SPADs), to increase the probability of positive photon events.

In some embodiments, the dual receiver system may include two light transmitters (e.g., lasers) that transmit light through a common optical path to an object field, and two light receivers that detect reflections of the transmitted light received at the system through the common optical path. The light receivers may include a short-range optical system including lens elements that refract a portion of the light reflected from within a range of, for example, 20 meters or less to a first sensor configured to capture the light, and a long-range optical system including one or more lens elements that refract a portion of the light reflected from within a range of, for example, 20 meters or more to a second sensor configured to capture the light. In some embodiments, the short-range optical system has a small aperture and provides a wide field of view, and the long-range optical system has a large aperture and provides a small field of view.

In some embodiments, the long-range optical system may include five refractive lens elements. In some embodiments, field of view of the long-range optical system may be 15 degrees or less. In some embodiments, F-number of the long-range optical system may be 1.2 or less. In some embodiments, the surfaces of the lens elements in the long-range optical system are one of spherical, even-aspheric, or flat/plano surfaces. In some embodiments, the long-range optical system may include an optical bandpass filter, or alternatively an optical bandpass filter coating on a plano surface of one of the lens elements.

In some embodiments, the short-range optical system may include seven refractive lens elements. In some embodiments, the short-range optical system may include six refractive lens elements. In some embodiments, the short-range optical system has a field of view of between 45 and 65 degrees. In some embodiments, F-number of the short-range optical system may be 2.0 or less. In some embodiments, the surfaces of the lens elements in the short-range optical system are one of spherical, even-aspheric, or flat/plano surfaces. In some embodiments, the short-range optical system may include an optical bandpass filter, or alternatively an optical bandpass filter coating on a flat/plano surface of one of the lens elements.

Note that the various parameters of the optical systems are given by way of example and are not intended to be limiting. For example, the optical systems may include more or fewer lens elements than described in the example embodiments, shapes of the lens elements may vary from those described, and the optical properties (e.g., field of view, aperture, F-number, etc.) of the optical systems may be different than those described while still providing similar performance for the optical systems. Further note that the optical systems may be scaled up or down to provide larger or smaller implementations of the optical systems as described herein.

While embodiments of optical systems are described in reference to use in systems such as LiDAR systems, the optical systems described herein may be used in a variety of other applications. Also note that while embodiments are described in reference to dual receiver systems, embodiments of the optical systems may be used in systems that include one or more than two receivers.

Tables 1 through 5 provide example values for various optical and physical parameters of the example embodiments of the optical systems described in reference to FIGS. 1 through 5. In the Tables, all dimensions are in millimeters (mm) unless otherwise specified. "S#" stands for surface number. A positive radius indicates that the center of curvature is to the right (object side) of the surface. A negative radius indicates that the center of curvature is to the left (image side) of the surface. "Infinity" stands for infinity as used in optics. The thickness (or gap/separation) is the axial distance to the next surface.

In the example embodiments of the optical systems described in reference to FIGS. 1 through 5, the lens elements may be formed of various plastic or glass materials. Two or more of the lens elements in a given optical system may be formed of different materials. For the materials of the lens elements, a refractive index (e.g., $N_d$ at the helium d-line wavelength) may be provided, as well as an Abbe number $V_d$ (e.g., relative to the d-line and the C- and F-lines of hydrogen). The Abbe number, $V_d$, may be defined by the equation:

$$V_d = (N_d - 1)/(N_F - N_C),$$

where $N_F$ and $N_C$ are the refractive index values of the material at the F and C lines of hydrogen, respectively.

Note that the values given in the following Tables for the various parameters in the various embodiments of the optical systems are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the optical systems. In particular, note that some values in the Tables may be scaled up or down for larger or smaller implementations of the optical systems as described herein.

Further note that surface numbers (S#) of the elements in the various embodiments of the optical systems as shown in the Tables are listed from a first surface (FIG. 1), stop (FIG. 3), or object-side surface of a first lens element (FIGS. 2, 4, and 5), to a last surface at the image plane/photosensor surface.

FIG. 1 and Table 1—Long-range Optical System 100

FIG. 1 and Table 1 illustrate an example embodiment 100 of an optical system that may, for example, be used as a long-range optical system in LiDAR applications. In some embodiments, optical system 100 may have five refractive lens elements 101-105 arranged in order from a first lens element 101 on the object side of optical system 100 to a last lens element 105 on the image side of optical system 100. Optical system 100 may include a stop, for example located between lens 102 and lens 103 as shown in FIG. 1. Optical system 100 may also include an optical bandpass filter, for example located at or on surface S4 of lens 102 as shown in FIG. 1. Optical system 100 may be configured to refract light from an object field to an image plane formed at or near the surface of a sensor 190. Sensor 190 may, for example, include one or more single photo-avalanche detectors (SPADs). However, other types of photodetectors may be used in some embodiments.

Lens element 101 may be a biconvex lens with positive refractive power. In some embodiments, both surfaces of lens element 101 may be spherical. Lens element 102 may be a plano-concave lens with negative refractive power. Lens element 102 may have a concave object side surface and a plano (flat) image side surface. In some embodiments, the object side surface of lens element 102 may be spherical. In some embodiments, the object side surface of lens element 102 may contact the image side surface of lens 101. Lens element 103 may be a meniscus lens with positive refractive power. Lens element 103 may have a convex object side surface and a concave image side surface. In some embodiments, both surfaces of lens element 103 may be spherical. Lens element 104 may be a meniscus lens with positive refractive power. Lens element 104 may have a convex object side surface and a concave image side surface. In some embodiments, both surfaces of lens element 104 may be spherical. Lens element 105 may be a biconcave lens with negative refractive power. In some embodiments, both surfaces of lens element 105 may be spherical.

Properties and advantages of optical system 100 may include one or more of, but are not limited to:

The optical system 100 may have five or fewer lenses.

One or more of the lenses may have spherical surfaces; in some embodiments, all of the lenses have spherical surfaces.

The optical system 100 may have a large entrance pupil (e.g., 40 mm) and a small F-number (e.g., 1.125 or less), and may provide a small field of view (e.g., 15 degrees or less).

The optical system 100 may be a telecentric lens (e.g., an image-space telecentric lens) to provide minimum image scale change when a focal plane is introduced and during variations in temperature.

The optical system 100 may include an optical bandpass filter for optimum probability of detection for photoelectric events. For example, the optical system 100 may include a filter at or on surface S4 of lens 102 as shown in FIG. 1 to mitigate the likelihood of unwanted pupil ghosts at the focus (image plane).

The optical system 100 may achieve system specifications over a large temperature range (e.g., −40 degrees C. to 80 degrees C.) and source bandwidth (e.g., 900 nanometers (nm)-1000 nm).

The optical system 100 may be optimized for compact SPAD configurations.

The optical system 100 may have less than 0.2% negative distortion and almost 100% relative illumination over the field of view for optimum photon probability of detection.

The optical system 100 may include a stop (aperture), for example located between lens 102 and lens 103 as illustrated in FIG. 1.

In some embodiments, the optical system 100 may be integrated with a multiple scanning mirror system (e.g., a MEMS mirror) to collect laser radiation from long-range objects and image the objects with sufficient precision to one or more SPAD chips at the focus (image plane).

TABLE 1

Receiver optical system 100

|  | Surface | Type | Radius of curvature (mm) | Thickness or Gap | Material |
|---|---|---|---|---|---|
|  | Object | STANDARD | Infinity | Infinity |  |
|  | S1 | STANDARD | Infinity | 25.40005 |  |
| Lens 101 | S2 | STANDARD | 50.52775 | 12.62115 | BK7 |
| Lens 102 | S3 | STANDARD | −47.35588 | 5.635905 | SF6 |
|  | S4 | STANDARD | Infinity | 0.6117068 |  |
| Stop | Stop | STANDARD | Infinity | 2.391139 |  |
| Lens 103 | S6 | STANDARD | 30.71983 | 10.29709 | S-LAL9 |
|  | S7 | STANDARD | 52.66062 | 20.62353 |  |
| Lens 104 | S8 | STANDARD | 23.27457 | 6.938469 | SF6 |
|  | S9 | STANDARD | 166.2798 | 5.000918 |  |
| Lens 105 | S10 | STANDARD | −27.73724 | 4.946685 | SF6 |
|  | S11 | STANDARD | 139.1987 | 5.0 |  |
| Sensor 190 | Image | STANDARD | Infinity |  |  |

Figure 2:
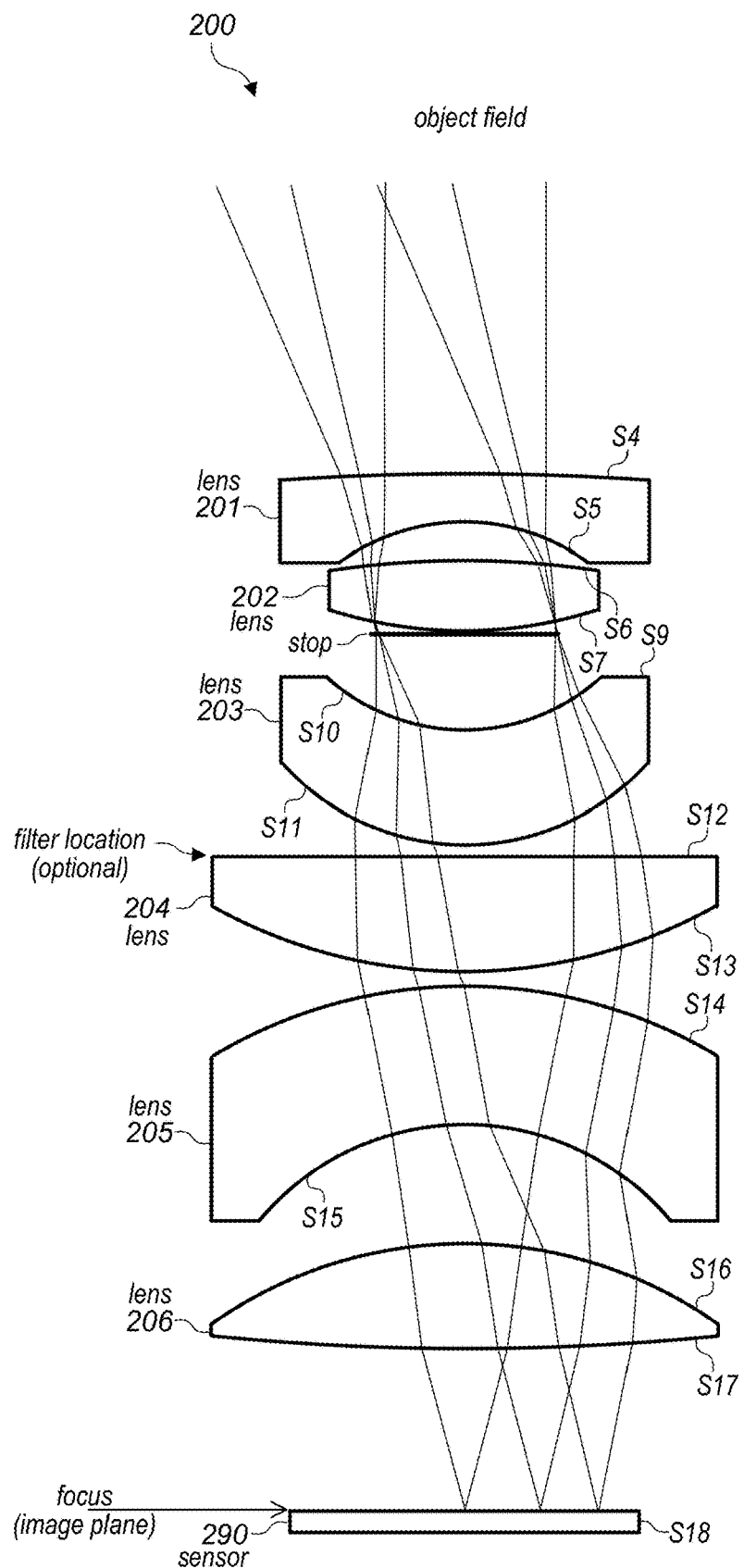
FIG. 2 illustrates an example embodiment of an optical system that may, for example, be used as a short-range optical system in LiDAR applications.

FIG. 2 and Table 2—Short-range Optical System 200

FIG. 2 and Table 2 illustrate an example embodiment 200 of an optical system that may, for example, be used as a short-range optical system in LiDAR applications. In some embodiments, optical system 200 may have six refractive lens elements 201-206 arranged in order from a first lens element 201 on the object side of optical system 200 to a last lens element 206 on the image side of optical system 200. Optical system 200 may include a stop, for example located between lens 202 and lens 203 as shown in FIG. 2. Optical system 200 may also include an optical bandpass filter, for example located at or on surface S12 of lens 204 as shown in FIG. 2. Optical system 200 may be configured to refract light from an object field to an image plane formed at or near the surface of a sensor 290. Sensor 290 may, for example, include one or more single photo-avalanche detectors (SPADs). However, other types of photodetectors may be used in some embodiments.

Lens element 201 may be a meniscus lens with negative refractive power. Lens element 201 may have a convex object side surface and a concave image side surface. In some embodiments, surface S4 of lens element 201 may be even aspheric or spherical, and surface S5 of lens element 201 may be spherical. Lens element 202 may be a biconvex lens with positive refractive power. In some embodiments, surface S6 of lens element 202 may be spherical, and surface S7 of lens element 202 may be even aspheric or spherical. Lens element 203 may be a meniscus lens with positive refractive power. Lens element 203 may have a concave object side surface and a convex image side surface. In some embodiments, surfaces S10 and S11 of lens element 203 may be spherical. Lens element 204 may be a plano-convex lens with positive refractive power. Lens element 204 may have a plano (flat) object side surface and a convex image side surface. In some embodiments, surface S13 of lens 204 may be spherical. Lens element 205 may be a meniscus lens with negative refractive power. In some embodiments, surface S14 of lens element 205 may be convex, and surface S15 of lens element 205 may be concave. In some embodiments, surface S14 of lens element 205 may be spherical, and surface S15 of lens element 205 may be even aspheric or spherical. Lens element 206 may be a biconvex lens with positive refractive power. In some embodiments, surface S16 of lens element 206 may be spherical, and surface S17 of lens element 206 may be even aspheric or spherical.

Properties and advantages of optical system 200 may include one or more of, but are not limited to:

The optical system 200 may have six or fewer lenses.

One or more of the lenses may have spherical surfaces; in some embodiments, all of the lenses have spherical surfaces.

The optical system 200 may have a small F-number (e.g., 2.0 or less), and may provide a large field-of-view (e.g., 60 degrees or greater).

The optical system 200 may be a telecentric lens (e.g., an image-space telecentric lens) to minimize the effects of photon centroid motion and triangulation for short optical ranges.

The optical system 200 may include an optical bandpass filter for optimum probability of detection for photoelectric events. For example, the optical system 200 may include a filter at or on a flat surface S12 of lens 204 as shown in FIG. 2.

The optical system 100 may system specifications over a large temperature range (e.g., −40 degrees C. to 80 degrees C.) and source bandwidth (e.g., 900 nm-1000 nm).

The optical system 200 may be optimized for compact SPAD configurations.

The optical system 200 may have less than 5% negative distortion and greater than 60% relative illumination over the field for optimum photon probability of detection.

The optical system 200 may include a stop (aperture), for example located between lens 202 and lens 203 as illustrated in FIG. 2.

In some embodiments, the optical system 200 may be integrated with a multiple scanning mirror system (e.g., a MEMS mirror) to collect laser radiation from short-range objects and image the objects with sufficient precision to one or more SPAD chips at the focus (image plane).

TABLE 2

Receiver optical system 200

| | Surface | Type | Radius of curvature | Thickness or Gap | Material |
|---|---|---|---|---|---|
| Lens 201 | S4 | Even Aspheric | 160.0949 | 2.0 | BK7 |
| | S5 | STANDARD | 9.310111 | 1.705925 | |
| Lens 202 | S6 | STANDARD | 44.142 | 3.000001 | SF6 |
| | S7 | Even Aspheric | −20.31882 | 0.1999999 | |
| | Stop | STANDARD | Infinity | 0 | |
| Lens 203 | S9 | STANDARD | Infinity | 4.144555 | |
| | S10 | STANDARD | −8.87866 | 5.0 | SF6 |
| | S11 | STANDARD | −10.73887 | 0.4619624 | |
| Lens 204 | S12 | STANDARD | Infinity | 5.017804 | SF6 |
| | S13 | STANDARD | −23.29207 | 0.6136292 | |
| Lens 205 | S14 | STANDARD | 21.1782 | 6.056791 | SF6 |
| | S15 | Even Aspheric | 11.76076 | 5.193445 | |
| Lens 206 | S16 | STANDARD | 19.42751 | 4.478419 | SF6 |
| | S17 | Even Aspheric | −120.8147 | 7.127467 | |
| Sensor 290 | Image | STANDARD | Infinity | | |

Figure 3:
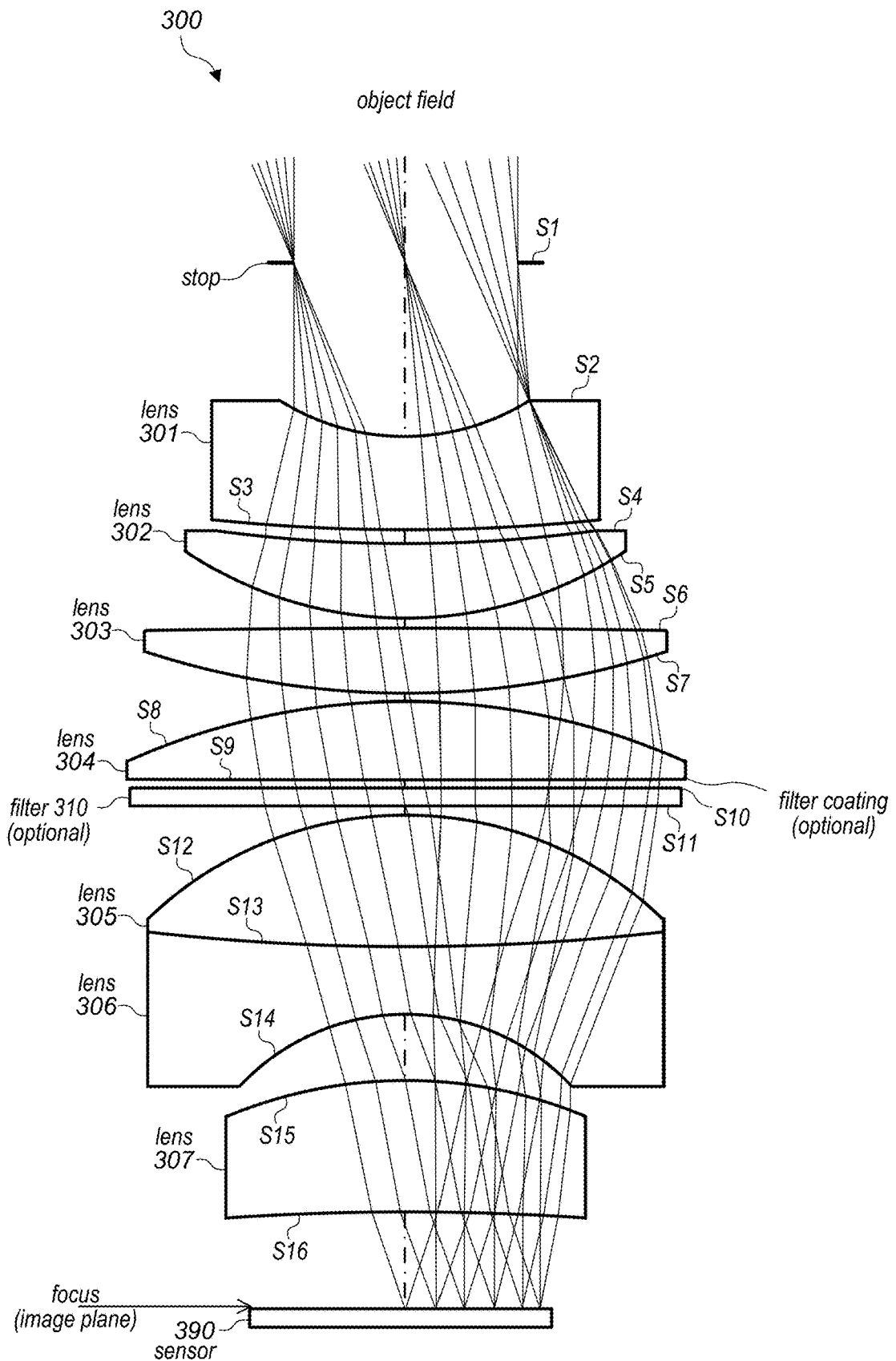
FIG. 3 illustrates an example embodiment of an optical system that may, for example, be used as a short-range optical system in LiDAR applications.

FIG. 3 and Table 3—Receiver Optical System 300

FIG. 3 and Table 3 illustrate an example embodiment 300 of an optical system that may, for example, be used as a short-range optical system in LiDAR applications. In some embodiments, optical system 300 may have seven refractive lens elements 301-307 arranged in order from a first lens element 301 on the object side of optical system 300 to a last lens element 307 on the image side of optical system 300. Optical system 300 may include a stop, for example located between lens 301 and the object field as shown in FIG. 3. Optical system 300 may also include an optical bandpass filter 310, for example located between lens 304 and 305 as shown in FIG. 3, or alternatively may have an optical bandpass filter coating on surface S9 of lens 304 as shown in FIG. 3. Optical system 300 may be configured to refract light from an object field to an image plane formed at or near the surface of a sensor 390. Sensor 390 may, for example, include one or more single photo-avalanche detectors (SPADs). However, other types of photodetectors may be used in some embodiments.

Lens element 301 may be a meniscus lens with negative refractive power. Lens element 301 may have a concave object side surface and a convex image side surface. In some embodiments, both surfaces of lens element 301 may be spherical. Lens element 302 may be a meniscus lens with positive refractive power. In some embodiments, both surfaces of lens element 302 may be spherical. Lens element 302 may have a concave object side surface and a convex image side surface. Lens element 303 may be a plano-convex lens with positive refractive power. Lens element 303 may have a plano (flat) object side surface and a convex image side surface. In some embodiments, the image side surface of lens element 303 may be spherical. Lens element 304 may be a plano-convex lens with positive refractive power. Lens element 304 may have a convex object side surface and a plano (flat) image side surface. In some embodiments, the object side surface of lens 304 may be spherical. Lens element 305 may be a biconvex lens with positive refractive power. In some embodiments, both surfaces of lens element 305 may be spherical. Lens element 306 may be a biconcave lens with negative refractive power. In some embodiments, both surfaces of lens element 206 may be spherical. In some embodiments, the object side surface of lens element 306 may contact the image side surface of lens 305. Lens element 307 may be a meniscus lens with positive refractive power. In some embodiments, both surfaces of lens element 307 may be spherical. Lens element 702 may have a convex object side surface and a concave image side surface.

Properties and advantages of optical system 300 may include one or more of, but are not limited to:

The optical system 300 may be a fast lens with a low F-number, for example within a range of 1.5 to 1.6, for example 1.53.

The optical system 300 may provide 45 degree field of view coverage in both azimuth and elevation.

The optical system 300 may be corrected over a wide spectral range to account for source wavelength variability (unit to unit). For example, in some embodiments, up to +/−50 nm can be tolerated with a simple refocus of the optical system 300 during assembly.

The optical system 300 may be corrected for up to 12 nm spectral width to accommodate the source spectral width and the drift of the source spectrum with temperature.

The optical system 300 may include seven lens elements. In some embodiments all of the lens elements have spherical surfaces, which may lower costs.

The optical system 300 design allows for easy manufacturing tolerances for the lens elements as well as for lens assembly.

The optical system 300 may be athermalized over a temperature range of −40 degrees C. to 80 degrees C.

when assembled with a stainless steel barrel. This may, for example, help to ensure the resolution of the system 300 over a wide operating range while preserving both the focus and the focal length of the system 300.

The optical system 300 may have a low distortion design that allows pre-mapping of object angle to sensor position without losing angular resolution.

The optical system 300 may be a telecentric lens (e.g., an image-space telecentric lens) to ensure that the signal at the sensor is correctly mapped from angle in the object space to placement in the image space irrespective of object distance.

In some embodiments, a plano (flat) surface (e.g., surface S9 of lens 304 as shown in FIG. 3) is available internal to the optical system 300 in a space that is collimated or nearly collimated to allow the deposition of a narrow pass band coating directly on the plano surface of the lens (e.g., surface S9 of lens 304 as shown in FIG. 3), thus obviating the need for a filter element. Alternatively, in some embodiments, a separate filter 310 may be placed in the same collimated space (between lens 304 and lens 305), and performance can be recovered by a simple refocus during assembly.

The optical system 300 may include a stop (aperture), for example at or in front of lens 301 as illustrated in FIG. 3.

In some embodiments, the optical system 300 may be integrated with a multiple scanning mirror system (e.g., a MEMS mirror) to collect laser radiation from short-range objects and image the objects with sufficient precision to one or more SPAR chips at the focus (image plane).

TABLE 3

Receiver optical system 300

| Element | Surface | Surface type | Radius of curvature (mm) | Thickness or Gap (mm) | Refractive Index | Abbe Number |
|---|---|---|---|---|---|---|
| | Object | | Infinity | Infinity | | |
| Stop | S1 | Stop | Infinity | 19.90 | | |
| Lens 301 | S2 | Spherical | −27.52 | 10.75 | 1.784701 | 26.08 |
| | S3 | Spherical | −289.00 | 1.7 | | |
| Lens 302 | S4 | Spherical | −165.66 | 8.00 | 1.804200 | 46.50 |
| | S5 | Spherical | −45.74 | 1.00 | | |
| Lens 303 | S6 | Spherical | Infinity | 7.50 | 1.804200 | 46.50 |
| | S7 | Spherical | −79.90 | 1.00 | | |
| Lens 304 | S8 | Spherical | 76.20 | 8.84 | 1.753930 | 52.27 |
| | S9 | Plano | Infinity | 1.00 | | |
| Filter (optional) | S10 | Plano | Infinity | 2.00 | 1.516800 | 64.17 |
| | S11 | Plano | Infinity | 1.00 | | |
| Lens 305 | S12 | Spherical | 43.70 | 15.00 | 1.743972 | 44.85 |
| Lens 306 | S13 | Spherical | −162.65 | 8.50 | 1.805182 | 25.43 |
| | S14 | Spherical | 26.16 | 8.013 | | |
| Lens 307 | S15 | Spherical | 53.00 | 15.00 | 1.696800 | 55.41 |
| | S16 | Spherical | 261.00 | 10.687262 | | |
| Sensor 390 | Sensor | Plano | Infinity | 0.00 | | |

Figure 4:
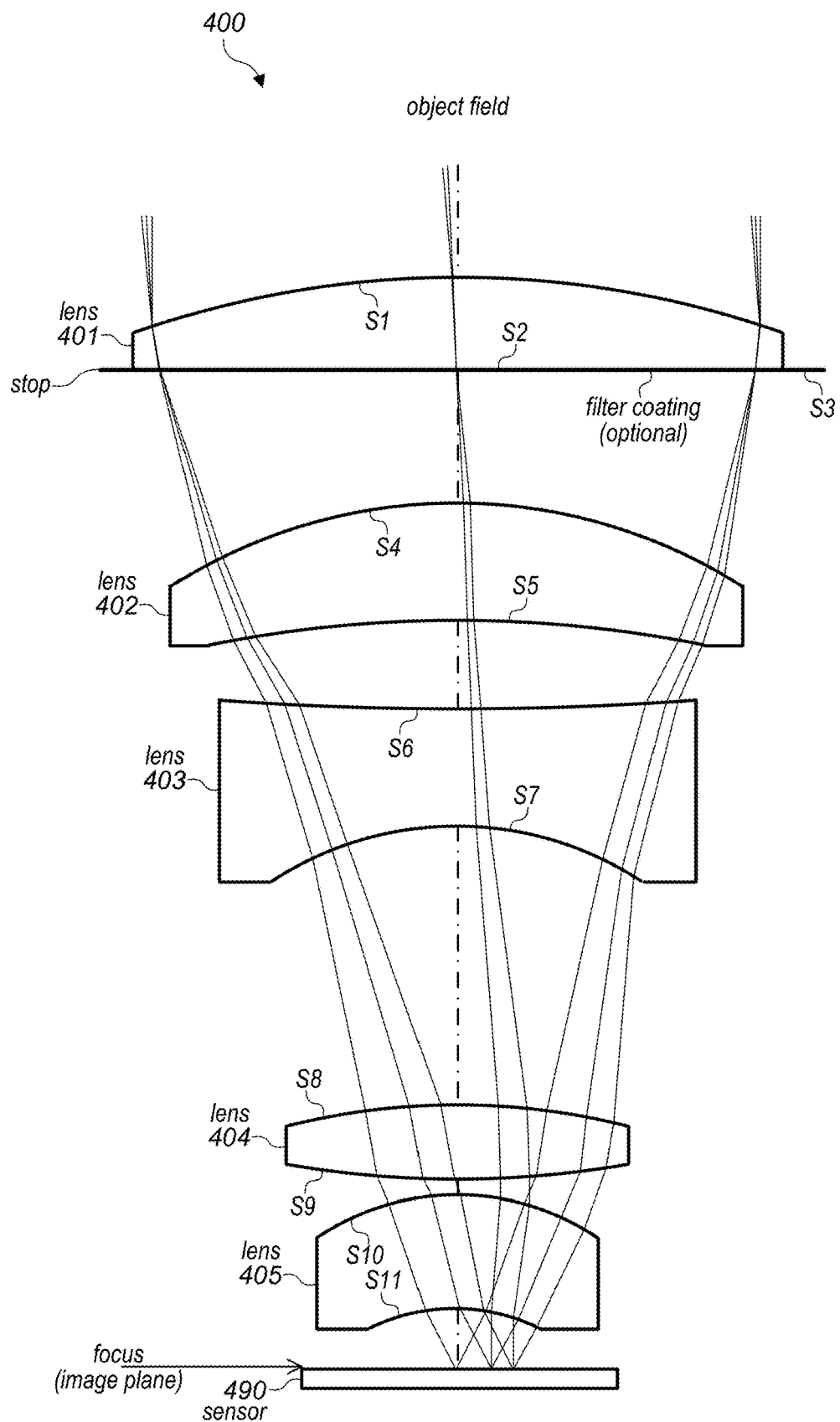
FIG. 4 illustrates an example embodiment of an optical system that may, for example, be used as a long-range optical system in LiDAR applications.

FIG. 4 and Table 4—Receiver Optical System 400

FIG. 4 and Table 4 illustrate an example embodiment 400 of an optical system that may, for example, be used as a long-range optical system in LiDAR applications. In some embodiments, optical system 400 may have five refractive lens elements 401-405 arranged in order from a first lens element 401 on the object side of optical system 400 to a last lens element 405 on the image side of optical system 400. Optical system 400 may include a stop, for example located between lens 401 and lens 402 as shown in FIG. 4. Optical system 400 may also include an optical bandpass filter, for example located at or on the image side surface (surface S2)

of lens 401 as shown in FIG. 4. Optical system 400 may be configured to refract light from an object field to an image plane formed at or near the surface of a sensor 490. Sensor 490 may, for example, include one or more single photo-avalanche detectors (SPADs). However, other types of photodetectors may be used in some embodiments.

Lens element 401 may be a plano-convex lens with positive refractive power. Lens element 401 may have a convex object side surface and a plano (flat) image side surface. In some embodiments, the object side surface of lens element 401 may be spherical. Lens element 402 may be a meniscus lens with positive refractive power. Lens element 402 may have a convex object side surface and a concave image side surface. In some embodiments, both surfaces of lens element 402 may be spherical. Lens element 403 may be a biconcave lens with negative refractive power. In some embodiments, both surfaces of lens element 403 may be spherical. Lens element 404 may be a biconvex lens with positive refractive power. In some embodiments, both surfaces of lens element 404 may be spherical. Lens element 405 may be a meniscus lens with positive refractive power. In some embodiments, both surfaces of lens element 405 may be spherical. Lens element 405 may have a convex object side surface and a concave image side surface.

Properties and advantages of optical system 400 may include one or more of, but are not limited to:

The optical system 400 may be a fast lens with a low F-number, for example within a range of 1.1 to 1.2, for example 1.125.

The optical system 400 may provide a 10 degree field of view.

The optical system 400 may be corrected over a wide spectral range to account for source wavelength variability (unit to unit). For example, in some embodiments, up to +/−50 nm can be tolerated with a simple refocus of the optical system 400 during assembly.

The optical system 400 may be corrected for up to 12 nm spectral width to accommodate the source spectral width and the drift of the source spectrum with temperature.

The optical system 400 may include five lens elements. In some embodiments all of the lens elements have spherical surfaces, which may lower costs.

The optical system 400 design allows for easy manufacturing tolerances for the lens elements as well as for lens assembly.

The optical system 400 may be athermalized over a temperature range of −40 degrees C. to 80 degrees C. when assembled with a stainless steel barrel. This may, for example, help to ensure the resolution of the system 400 over a wide operating range while preserving both the focus and the focal length of the system 400.

The optical system 400 may have a low distortion design (e.g., distortion <−0.2%).

The optical system 400 may be a telecentric lens (e.g., an image-space telecentric lens) to ensure that the signal at the sensor is correctly mapped from angle in the object space to placement in image space irrespective of object distance.

In some embodiments, a plano surface (e.g., surface S2 of lens element 401 in FIG. 4) is available internal to the optical system 400 in a space that is collimated or nearly collimated to allow the deposition of a narrow pass band coating directly on the plano surface of the lens (e.g., surface S2 of lens element 401 in FIG. 4), thus obviating the need for a filter element.

The optical system 400 may include a stop (aperture), for example located between lens 401 and lens 402 as illustrated in FIG. 4.

In some embodiments, the optical system 400 may be integrated with a multiple scanning mirror system (e.g., a MEMS mirror) to collect laser radiation from long-range objects and image the objects with sufficient precision to one or more SPAR chips at the focus (image plane).

TABLE 4

Receiver optical system 400

| Element | Surface | Surface type | Radius of curvature (mm) | Thickness or Gap (mm) | Refractive Index | Abbe Number |
|---|---|---|---|---|---|---|
| | Object | | Infinity | Infinity | | |
| Lens 401 | S1 | Spherical | 65.700 | 6.400 | 1.743972 | 44.85 |
| | S2 | Plano | Infinity | 0.000 | | |
| Stop | S3 | Stop | Infinity | 9.144 | | |
| Lens 402 | S4 | Spherical | 36.000 | 8.000 | 1.717360 | 29.62 |
| | S5 | Spherical | 89.650 | 6.120 | | |
| Lens 403 | S6 | Spherical | −209.900 | 8.000 | 1.487490 | 70.41 |
| | S7 | Spherical | 23.000 | 19.167 | | |
| Lens 404 | S8 | Spherical | 48.300 | 5.000 | 1.805180 | 25.36 |
| | S9 | Spherical | −81.240 | 1.002 | | |
| Lens 405 | S10 | Spherical | 16.500 | 8.000 | 1.805180 | 25.36 |
| | S11 | Spherical | 13.500 | 4.168 | | |
| Sensor 490 | Sensor | Plano | Infinity | 0.000 | | |

Figure 5:
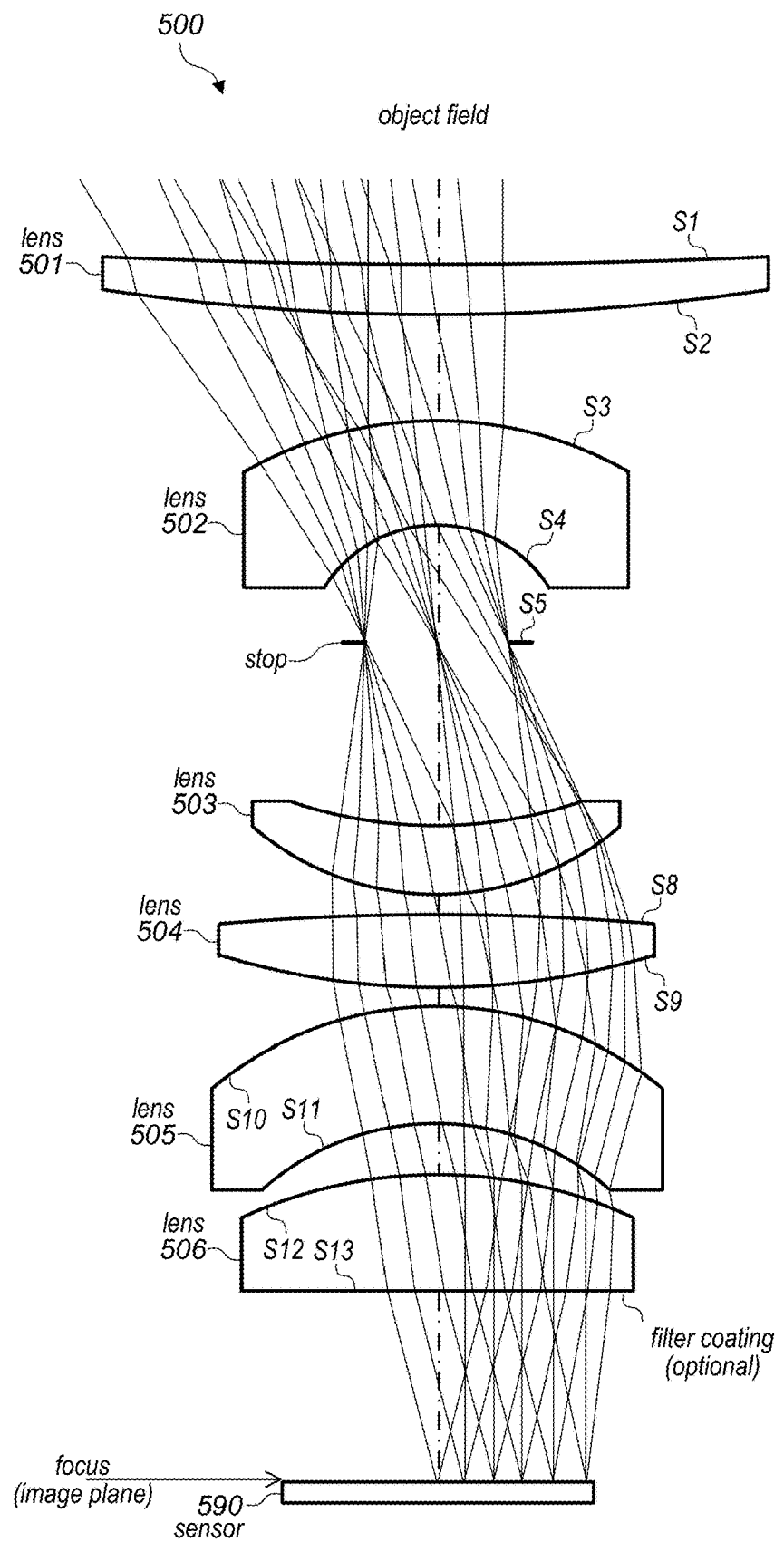
FIG. 5 illustrates an example embodiment of an optical system that may, for example, be used as a short-range optical system in LiDAR applications.

FIG. 5 and Table 5—Receiver Optical System 500

FIG. 5 and Table 5 illustrate an example embodiment 500 of an optical system that may, for example, be used as a short-range optical system in LiDAR applications. In some embodiments, optical system 500 may have six refractive lens elements 501-506 arranged in order from a first lens element 501 on the object side of optical system 500 to a last lens element 506 on the image side of optical system 500. Optical system 500 may include a stop, for example located between lens 502 and lens 503 as shown in FIG. 5. Optical system 500 may also include an optical bandpass filter, for example located at or on surface S13 of lens 506 as shown in FIG. 5. Optical system 500 may be configured to refract light from an object field to an image plane formed at or near the surface of a sensor 590. Sensor 590 may, for example, include one or more single photo-avalanche detectors (SPADs). However, other types of photodetectors may be used in some embodiments.

Lens element 501 may be a meniscus lens with positive refractive power. Lens element 501 may have a concave object side surface and a convex image side surface. In some embodiments, both surfaces of lens element 501 may be spherical. Lens element 502 may be a meniscus lens with negative refractive power. Lens element 502 may have a convex object side surface and a concave image side surface. In some embodiments, both surfaces of lens element 502 may be spherical. Lens element 503 may be a meniscus lens with positive refractive power. Lens element 503 may have a concave object side surface and a convex image side surface. In some embodiments, both surfaces of lens element 503 may be spherical. Lens element 504 may be a biconvex lens with positive refractive power. In some embodiments, both surfaces of lens 504 may be spherical. Lens element 505 may be a meniscus lens with negative refractive power. In some embodiments, the object side surface of lens element 505 may be convex, and the image side surface of lens element 505 may be concave. In some embodiments, both surfaces of lens element 505 may be spherical. Lens element 506 may be a plano-convex lens with positive refractive power. Lens element 506 may have a convex object side surface and a plano (flat) image side surface. In some embodiments, the object side surface of lens element 506 may be spherical.

Properties and advantages of optical system 500 may include one or more of, but are not limited to:

The optical system 500 may provide moderately fast optics (e.g. F-number of 2.0) in a compact form.

The optical system 500 may provide a 60 degree field of view

The optical system 500 may be athermalized over a temperature range of −40 degrees C. to 80 degrees C. when assembled with a stainless steel barrel. This may, for example, help to ensure the resolution of the system 500 over a wide operating range while preserving both the focus and the focal length of the system 500.

The optical system 500 may have a low distortion design that allows pre-mapping of object angle to sensor position without losing angular resolution.

The optical system 500 may be a telecentric lens (e.g., an image-space telecentric lens) to ensure that the signal at the sensor is correctly mapped from angle in the object space to placement in image space irrespective of object distance.

In some embodiments, a plano surface (e.g., surface S13 of lens element 506 in FIG. 5) is available internal to the optical system 500 in a space with a low diversity of angles to allow the deposition of a narrow pass band coating directly on the plano surface of the lens (e.g., surface S13 of lens element 506 in FIG. 5), thus obviating the need for a filter element.

The optical system 500 may include a stop (aperture), for example located between lens 502 and lens 503 as illustrated in FIG. 5.

In some embodiments, the optical system 400 may be integrated with a multiple scanning mirror system (e.g., a MEMS mirror) to collect laser radiation from short-range objects and image the objects with sufficient precision to one or more SPAR chips at the focus (image plane).

TABLE 5

Optical system 500

| Element | Surface | Surface type | Radius of curvature (mm) | Thickness or Gap (mm) | Refractive Index | Abbe Number |
|---|---|---|---|---|---|---|
| | Object | | Infinity | Infinity | | |
| Lens 501 | S1 | Spherical | −380.00 | 2.65 | 1.805180 | 25.36 |
| | S2 | Spherical | −112.90 | 5.40 | | |
| Lens 502 | S3 | Spherical | 19.20 | 5.40 | 1.487490 | 70.41 |
| | S4 | Spherical | 6.95 | 5.96 | | |
| Stop | S5 | Plano | Infinity | 9.40 | | |
| Lens 503 | S6 | Spherical | −23.33 | 3.60 | 1.805180 | 25.36 |
| | S7 | Spherical | −14.40 | 1.00 | | |
| Lens 504 | S8 | Spherical | 127.00 | 3.70 | 1.805180 | 25.36 |
| | S9 | Spherical | −40.16 | 1.00 | | |
| Lens 505 | S10 | Spherical | 17.93 | 6.00 | 1.805180 | 25.36 |
| | S11 | Spherical | 13.243 | 2.681 | | |
| Lens 506 | S12 | Spherical | 24.41 | 6.00 | 1.805180 | 25.36 |
| | S13 | Plano | Infinity | 9.853431 | | |
| Sensor 590 | Sensor | Plano | Infinity | 0.000 | | |

The optical system 500 may be corrected over a wide spectral range to account for source wavelength variability (unit to unit). For example, in some embodiments, up to +/−50 nm can be tolerated with a simple refocus of the optical system 500 during assembly.

The optical system 500 may be corrected for up to 12 nm spectral width to accommodate the source spectral width and the drift of the source spectrum with temperature.

The optical system 500 may include six lens elements. In some embodiments all of the lens elements have spherical surfaces, which may lower costs.

The optical system 500 design allows for easy manufacturing tolerances for the lens elements as well as for lens assembly.

Example LiDAR System

FIGS. 6A-6B and 7A-7B illustrate an example LiDAR system in which embodiments of the optical systems as described herein may be implemented.

FIGS. 6A and 6B are logical block diagrams of an example LiDAR system that combines laser pulse transmissions in light ranging and detecting (LiDAR), and in which embodiments of the optical systems as illustrated in FIGS. 1 through 5 may be implemented, according to some embodiments. In FIG. 6A, LiDAR 1000 illustrates the combined transmission of two different pulses, outbound pulse 1042 and 1044 via a common optical path 1030. LiDAR 1000 may implement two laser transmitters 1012 and 1014. Each laser transmitter 1012 and 1014 may be configured to transmit a separate train of one or more laser pulses (the reflections of which may be captured to determine distance measurements). The type of laser pulses transmitted by the transmitters 1012 and 1014 may be the same or different. For example transmitter 1012 may transmit a laser pulse with a same or different wavelength, pulse width, or amplitude than a laser pulse transmitted by transmitter 1014. In addition the different types of laser pulses transmitted by transmitters 1012 and 1014, the timing of transmitting the laser pulses may be different. For example, in some embodiments, laser pulses from transmitter 1012 may be transmitted according to one PRR (e.g., 1 megahertz), whereas laser pulses from transmitter 1014 may be transmitted according to an increased or decreased PRR (e.g., 0.5 megahertz). Transmissions between the two transmitters may also be interleaved according to a transmission timing difference (i.e., delta) between the two laser transmitters.

Figure 7A:
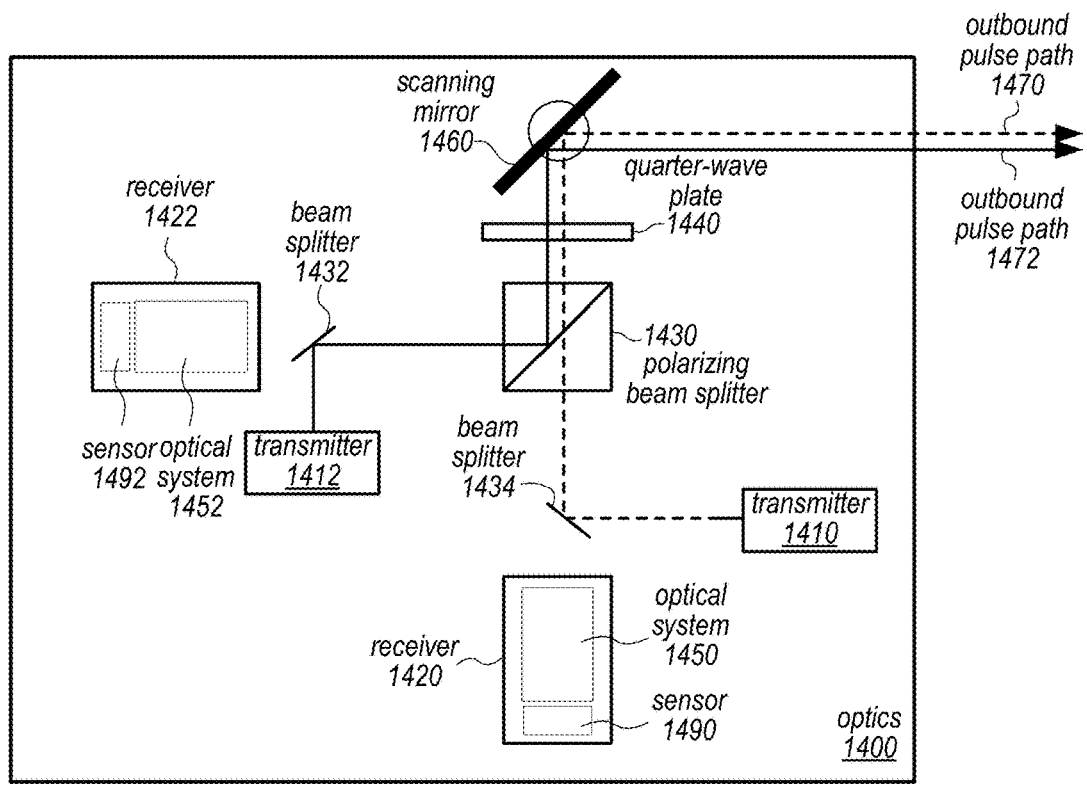
FIGS. 7A and 7B illustrate an example common optical path for laser pulses emitted by transmitters and pulse reflections received by receivers that include optical systems as illustrated in FIGS. 1 through 5, according to some embodiments.
Figure 7B:
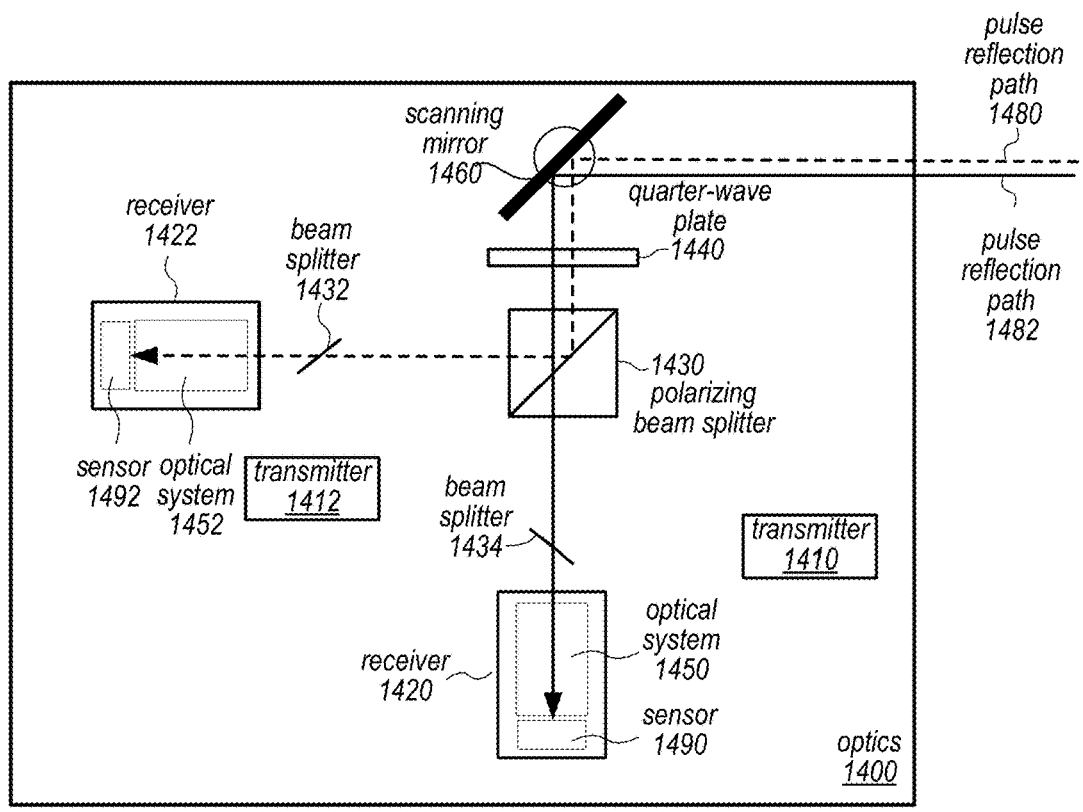

LiDAR 1000 may also implement a common optical path 1030 which combines pulses 1032 sent from the two different transmitters, transmitters 1012 and 1014. For example, as illustrated in FIG. 6A, outbound pulse 1042 may be a pulse transmitted from transmitter 1012 and outbound pulse 1044 may be a pulse transmitted from transmitter 1014 which are sent via the same optical path, common optical path 1030. Different combinations of optical devices (e.g., lenses, beam splitters, folding mirrors, or other any other device that processes or analyzes light waves) may be implemented as part of common optical path 1030 to combine pulses from transmitter 1012 and 1014 which may be transmitted with orthogonal polarizations (e.g., two different linear polarization states). For instance, laser pulses sent from transmitter 1012 may have vertical polarization state and laser pulses sent from transmitter 1014 may have a horizontal polarization state. To combine the pulses of orthogonal polarization states, the various combinations of optical devices in common optical path 1030 may be implemented to ensure that polarization states of the two different laser pulses are distinguishable, both on transmission and reflection, in various embodiments. In this way, reflections of the different pulses received via common optical path 1030 may be separated 1034 (as illustrated in FIG. 6B) and directed to the appropriate receiver for calculating a distance measure particular to the pulse transmitted from a particular transmitter (e.g., pulse 1042 transmitted from transmitter 1012 may be matched with the detection of inbound pulse reflection 1052 at receiver 1022, and outbound pulse 1044 may be matched with the detection of inbound pulse reflection 1054 at receiver 1024). FIGS. 7A-7B, discussed below, provide different examples of common optical paths which may be implemented.

As trains of laser pulses transmitted from transmitter 1012 and 1014 may be combined and transmitted via common optical path 1030 the distance measures which can be captured by LiDAR 1000 may vary. For instance, as the transmission delta between pulses may be configurable, the density or location distance measurements provided by LiDAR 1000 may be changed accordingly. Similarly, the PPR for transmitter 1012 may be slower to cover longer ranges. In some scenarios, transmitter 1012 may be configured to provide long-range distance measures and transmitter 1014 may be configured to provide close range distance measures, effectively providing a larger range of distance measures (e.g., dynamic range) that may be determined by LiDAR 1000. For example, transmitter 1012 may send laser pulses with a 1550 nm wavelength for a larger range of distance measures and transmitter 1014 may send laser pulses with a 930 nm wavelength to capture a close in range of distance measures. In some embodiments, receiver 1022 may include a long-range optical system as described herein in reference to FIG. 1 or 4 to receive return light from transmitter 1012, and receiver 1024 may include a short-range optical system as described herein in reference to FIG. 2, 3, or 5 to receive return light from transmitter 1014.

As noted above, different optical devices may be implemented to combine and separate laser pulses sent from different laser transmitters so that corresponding reflections are directed to the appropriate receivers. FIGS. 7A and 7B illustrate an example optical path for laser pulses and pulse reflections, according to some embodiments. In FIG. 7A, the outbound pulse path (1470 and 1472) for two different laser transmitters (1410 and 1412) is illustrated. Optics 1400 may implement transmitter 1410 which may send a laser pulse in a linear polarization state to beam splitter 1434 which in turn may direct the pulse to polarizing beam splitter 1430. Polarizing beam splitter 1430 may direct the pulse through quarter wave plate 1440, which may transform the polarization state from a linear polarization state to a circular polarization state. The transformed pulse may then be reflected off scanning mirror 1460 out into the environment. Optics 1400 may implement transmitter 1412 which may send a laser pulse to beam splitter 1432. The laser pulse sent from transmitter 1412 may be in a linear polarization state orthogonal the polarization state of pulses sent from transmitter 1410. Beam splitter 1432 may direct the pulse to polarizing beam splitter 1430. Polarizing beam splitter 1430 may direct the pulse through quarter wave plate 1440, which may transform the polarization state from a linear polarization state to a circular polarization state. The transformed pulse may then be reflected off scanning mirror 1460 which may direct the pulse out into the environment.

In FIG. 7B, pulse reflection path 1480 (which corresponds to reflections of pulses transmitted according to outbound pulse path 1470) and pulse reflection path 1482 (which corresponds to reflections of pulses transmitted according to outbound pulse path 1472) are illustrated. A pulse reflection of a pulse transmitted by transmitter 1410 may be received and reflected off scanning mirror 1460, directing the pulse through quarter-wave plate 1440. As the pulse was transmitted into the environment in a circular polarization state, the reflection may also be in a circular polarization state that is the reverse of the circular polarization state transmitted. For example, if outbound path 1470 transmits laser pulses in right-handed circular polarization state, the corresponding reflections will be received in left-handed circular polarization state. Thus, when quarter-wave plate 1440 transforms the polarization of the reflection the resulting linear polarization is orthogonal to the linear polarization state in which the laser pulse was originally transmitted from transmitter 1410. Thus, polarizing beam splitter 1430 directs the pulse through beam splitter 1432 and optical system 1452 in order to reach and be detected by sensor 1492 of receiver 1422. A pulse reflection of a pulse transmitted by transmitter 1412 may be received and reflected off scanning mirror 1460, directing the pulse through quarter-wave plate 1440. Again, the reflection may also be in a circular polarization state that is the reverse of the circular polarization state transmitted. For example, if outbound path 1472 transmits laser pulses in left-handed circular polarization state, the corresponding reflections will be received in right-handed circular polarization state. Thus, when quarter-wave plate 1440 transforms the polarization of the reflection the resulting linear polarization is orthogonal to the linear polarization state in which the laser pulse was originally transmitted from transmitter 1412. Thus, the pulse passes through polarizing beam splitter 1430, beam splitter 1434, and optical system 1450 in order to reach and be detected by sensor 1490 of receiver 1420.

In some embodiments, receiver 1420 may include a long-range optical system 1450 and a sensor 1490 as described herein in reference to FIG. 1 or 4 to receive return light from transmitter 1412, and receiver 1422 may include a short-range optical system 1452 and a sensor 1492 as described herein in reference to FIG. 2, 3, or 5 to receive return light from transmitter 1410.

Figure 8:
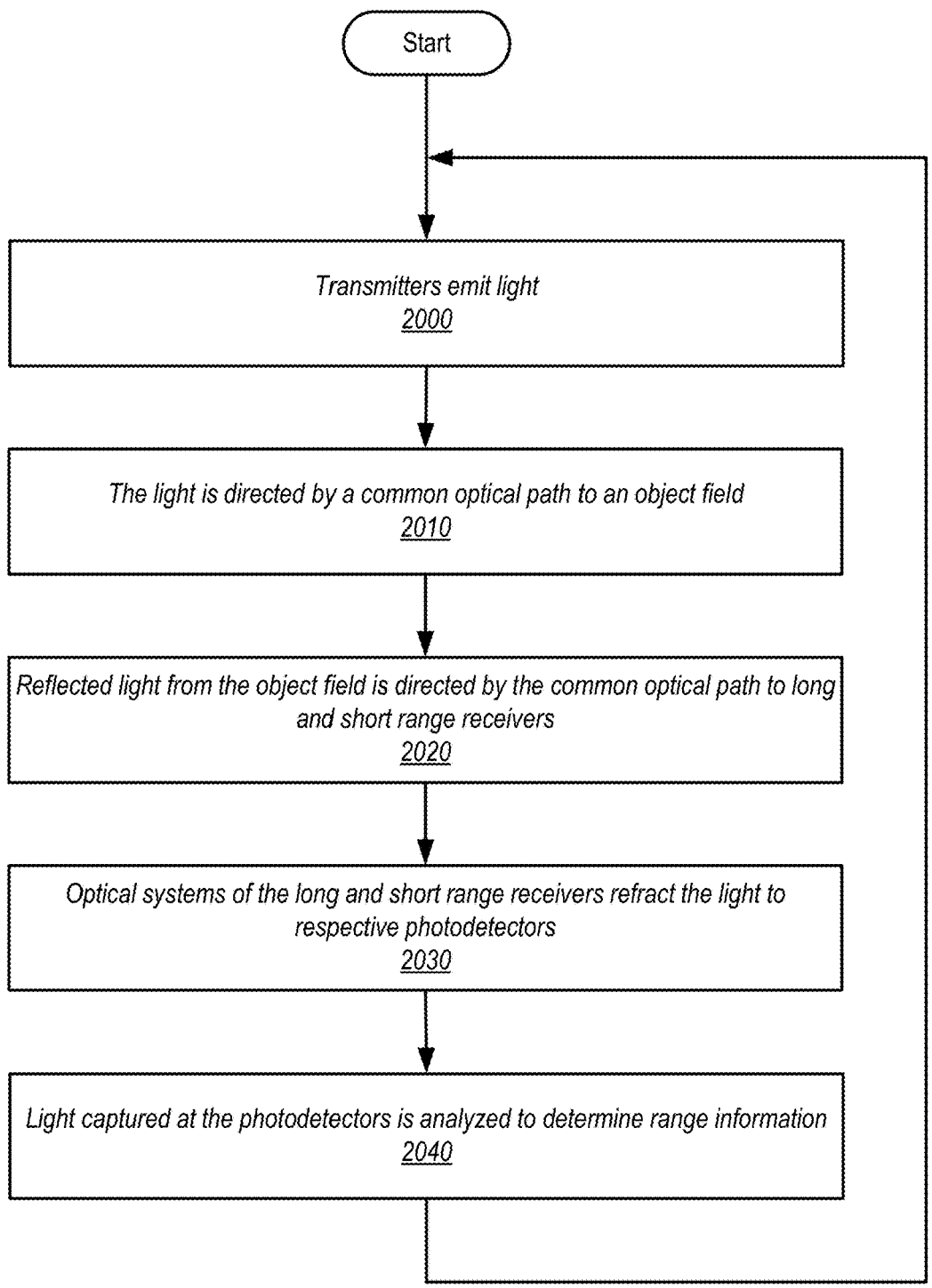
FIG. 8 is a high-level flowchart of a method of operation for a LiDAR system that includes light transmitters and long- and short-range receivers that include optical systems as illustrated in FIGS. 1 through 5.

FIG. 8 is a high-level flowchart of a method of operation for a LiDAR system that includes transmitters and long- and short-range receivers that include optical systems as illustrated in FIGS. 1 through 5. The method of FIG. 8 may, for example, be implemented in a LiDAR system as illustrated in FIGS. 6A through 7B.

As indicated at 2000, transmitters (e.g., two laser transmitters) emit light to a common optical path, for example as illustrated in FIGS. 6A and 7A. As indicated at 2010, the light is directed by the common optical path to an object field. In some embodiments, as illustrated in FIG. 7A, each transmitter may send a laser pulse in a linear polarization state to respective beam splitters, which in turn may direct the pulses to a polarizing beam splitter. In some embodiments, the linear polarization state of one transmitter may be orthogonal to the linear polarization state of the other transmitter. The polarizing beam splitter may direct the pulses through a quarter wave plate, which may transform the polarization state from a linear polarization state to a circular polarization state. The transformed pulses may then be reflected by a scanning mirror (e.g., a MEMS mirror) into the environment (i.e., the object field). The light (pulses) may be reflected by surfaces or objects in the object field. At least some of the reflected light may return to the LiDAR system.

As indicated at 2020, reflected light from the object field may be directed by the common optical path to long-range and short-range receivers. The common optical path may be configured to direct light that was emitted by one of the transmitters to the long-range receiver, and to direct light that was emitted by the other transmitter to the short-range receiver, for example as illustrated in FIG. 7B. In some embodiments, the reflected light from each transmitter may be in a circular polarization state that is the reverse of the circular polarization state that was transmitted. For example, if the light from one transmitter was transmitted in a left-handed circular polarization state, the corresponding reflections will be received in a right-handed circular polarization state. When the quarter-wave plate transforms the polarization of the reflected light, the resulting linear polarization is orthogonal to the linear polarization state in which the laser pulse was originally transmitted from a respective transmitter. The reflected light from each transmitter then passes through or is directed by the beam splitters in the optical path to reach the receiver corresponding to the transmitter.

As indicated at 2030, optical systems of the long-range and short-range receivers refract the light to respective photodetectors or sensors), for example one or more one-dimensional single photo-avalanche detectors (SPADs). Example optical systems that may be used in a long-range receiver are illustrated in FIGS. 1 and 4. Example optical systems that may be used in a short-range receiver are illustrated in FIGS. 2, 3, and 5.

As indicated at 2040, light captured at the photodetectors may be analyzed, for example to determine range information for objects or surfaces in the environment. In some embodiments, light captured by the long-range receiver may be analyzed to determine ranges for long-range objects or surfaces (e.g., 20 meters to 200 meters), and light captured by the short-range receiver may be analyzed to determine ranges for short-range objects (e.g., 20 meters or less). For example, distances may be calculated based on the difference between a time at which a laser pulse transmission is sent and a time at which a reflection of the laser pulse transmission is received. The analysis of the reflected light received at and captured by the long-range and short-range receivers may be used in many different applications. For instance, multiple distance measures taken over an area can be processed to generate a high resolution map, which can be used in a variety of different applications, including, but not limited to, geological surveys, atmospheric measurements, object detection, autonomous navigation, or other remote environmental sensing applications.

The arrow returning from element 2040 to element 2000 indicates that the method may continuously emit light (e.g., laser pulses) and receive and process reflections of the light as long as the system (e.g., LiDAR system) is in use.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A remote sensing system, comprising:
two transmitters that transmit light through a common optical path to an object field; and
two receivers that detect reflections of the transmitted light received at the system through the common optical path, wherein the two receivers include:
a short-range optical system including a plurality of refractive lens elements that refract a portion of the light reflected from a range of 20 meters or less to a first sensor that captures the light, wherein field of view of the short-range optical system is between 45 and 65 degrees, and wherein F-number of the short-range optical system is 2.0 or less; and
a long-range optical system including a plurality of refractive lens elements that refract a portion of the light reflected from a range of 20 meters or more to a second sensor that captures the light, wherein field of view of the long-range optical system is 15 degrees or less, and wherein F-number of the long-range optical system is 1.2 or less.

2. The remote sensing system as recited in claim 1, wherein the long-range optical system includes five refractive lens elements, and wherein surfaces of the lens elements in the long-range optical system include one or more of spherical, even-aspheric, or flat/plano surfaces.

3. The remote sensing system as recited in claim 1, wherein the short-range optical system includes six refractive lens elements, wherein surfaces of the lens elements in the short-range optical system include one or more of spherical, even-aspheric, or flat/plano surfaces.

4. The remote sensing system as recited in claim 1, wherein the short-range optical system includes seven refractive lens elements, wherein surfaces of the lens elements in the short-range optical system include one or more of spherical, even-aspheric, or flat/plano surfaces.

5. The remote sensing system as recited in claim 1, wherein one or both of the short-range optical system and the long-range optical system are image-space telecentric lenses.

6. The remote sensing system as recited in claim 1, wherein one or both of the short-range optical system and the long-range optical system include an optical bandpass filter.

7. The remote sensing system as recited in claim 1, wherein the sensors each include one or more single photo-avalanche detectors.

8. A long-range optical system for receiving reflected light from an object field, comprising:
five refractive lens elements that refract light reflected from a range of 20 meters or more to a photodetector, wherein surfaces of the refractive lens elements are spherical, even-aspheric, or flat/plano surfaces;
wherein field of view of the optical system is 15 degrees or less, and wherein F-number of the optical system is 1.2 or less.

9. The long-range optical system as recited in claim 8, wherein the five refractive lens elements include, in order from an object side of the optical system to an image side of the optical system:
a first lens element, wherein the first lens element is a biconvex lens with positive refractive power;
a second lens element, wherein the second lens element is a plano-concave lens with negative refractive power;
a third lens element, wherein the third lens element is a meniscus lens with positive refractive power;
a fourth lens element, wherein the fourth lens element is a meniscus lens with positive refractive power; and
a fifth lens element, wherein the fifth lens element is a biconcave lens with negative refractive power.

10. The long-range optical system as recited in claim 9, wherein the optical system further comprises:
a stop located between the second lens element and the third lens element; and
an optical bandpass filter located at the image side surface of the second lens element.

11. The long-range optical system as recited in claim 8, wherein the five refractive lens elements include, in order from an object side of the optical system to an image side of the optical system:
a first lens element, wherein the first lens element is a plano-convex lens with positive refractive power;
a second lens element, wherein the second lens element is a meniscus lens with positive refractive power;
a third lens element, wherein the third lens element is a biconcave lens with negative refractive power;
a fourth lens element, wherein the fourth lens element is a biconvex lens with positive refractive power; and
a fifth lens element, wherein the fifth lens element is a meniscus lens with positive refractive power.

12. The long-range optical system as recited in claim 11, wherein the optical system further comprises:
a stop located between the first lens element and the second lens element; and
an optical bandpass filter located at the image side surface of the first lens element.

13. The long-range optical system as recited in claim 8, wherein the long-range optical system is an image-space telecentric lens.

14. A short-range optical system for receiving reflected light from an object field, comprising:
a plurality of refractive lens elements that refract light reflected from a range of 20 meters or less to a photodetector, wherein surfaces of the refractive lens elements are spherical, even-aspheric, or flat/plano surfaces;
wherein field of view of the short-range optical system is between 45 and 65 degrees, and wherein F-number of the short-range optical system is 2.0 or less.

15. The short-range optical system as recited in claim 14, wherein the plurality of refractive lens elements includes, in order from an object side of the optical system to an image side of the optical system:
a first lens element, wherein the first lens element is a meniscus lens with negative refractive power;
a second lens element, wherein the second lens element is a biconvex lens with positive refractive power;
a third lens element, wherein the third lens element is a meniscus lens with positive refractive power;
a fourth lens element, wherein the fourth lens element is a plano-convex lens with positive refractive power;
a fifth lens element, wherein the fifth lens element is a meniscus lens with negative refractive power; and
a sixth lens element, wherein the sixth lens element is a biconvex lens with positive refractive power.

16. The short-range optical system as recited in claim 15, wherein the optical system further comprises:
a stop located between the second lens element and the third lens element; and
an optical bandpass filter located at the object side surface of the fourth lens element.

17. The short-range optical system as recited in claim 14, wherein the plurality of refractive lens elements includes, in order from an object side of the optical system to an image side of the optical system:

a first lens element, wherein the first lens element is a meniscus lens with negative refractive power;
a second lens element, wherein the second lens element is a meniscus lens with positive refractive power;
a third lens element, wherein the third lens element is a plano-convex lens with positive refractive power;
a fourth lens element, wherein the fourth lens element is a plano-convex lens with positive refractive power;
a fifth lens element, wherein the fifth lens element is a biconvex lens with positive refractive power; and
a sixth lens element, wherein the sixth lens element is a biconcave lens with negative refractive power; and
a seventh lens element, wherein the seventh lens element is a meniscus lens with positive refractive power.

18. The short-range optical system as recited in claim 15, wherein the optical system further comprises:

a stop located on the object side of the first lens element; and
an optical bandpass filter located between the fourth lens element and the fifth lens element.

19. The short-range optical system as recited in claim 14, wherein the plurality of refractive lens elements includes, in order from an object side of the optical system to an image side of the optical system:

a first lens element, wherein the first lens element is a meniscus lens with positive refractive power;
a second lens element, wherein the second lens element is a meniscus lens with negative refractive power;
a third lens element, wherein the third lens element is a meniscus lens with positive refractive power;
a fourth lens element, wherein the fourth lens element is a biconvex lens with positive refractive power;
a fifth lens element, wherein the fifth lens element is a meniscus lens with negative refractive power; and
a sixth lens element, wherein the sixth lens element is a plano-convex lens with positive refractive power.

20. The short-range optical system as recited in claim 15, wherein the optical system further comprises:

a stop located between the second lens element and the third lens element; and
an optical bandpass filter located at the object side surface of the sixth lens element.

21. The short-range optical system as recited in claim 14, wherein the short-range optical system is an image-space telecentric lens.

* * * * *